United States Patent
Lopes Barreto et al.

(10) Patent No.: US 12,302,040 B2
(45) Date of Patent: May 13, 2025

(54) TRIGGERING SYSTEM

(71) Applicant: Cyclomedia Technology B.V., Zaltbommel (NL)

(72) Inventors: José Herculano Lopes Barreto, Zaltbommel (NL); Cornelis Alexander Elizabeth Van Sterkenburg, Zaltbommel (NL); Bart Johannes Beers, Zaltbommel (NL)

(73) Assignee: Cyclomedia Technology B.V., Zaltbommel (NL)

( * ) Notice: Subject to any disclaimer, the term of this patent is extended or adjusted under 35 U.S.C. 154(b) by 129 days.

(21) Appl. No.: 17/867,471

(22) Filed: Jul. 18, 2022

(65) Prior Publication Data
US 2023/0019084 A1 Jan. 19, 2023

(30) Foreign Application Priority Data

Jul. 19, 2021 (NL) ..................................... 2028779

(51) Int. Cl.
| | |
|---|---|
| *H04N 7/18* | (2006.01) |
| *G01S 19/47* | (2010.01) |
| *H04N 23/73* | (2023.01) |
| *H04N 23/90* | (2023.01) |

(52) U.S. Cl.
CPC ............. *H04N 7/188* (2013.01); *G01S 19/47* (2013.01); *H04N 23/73* (2023.01); *H04N 23/90* (2023.01)

(58) Field of Classification Search
CPC .... H04N 7/188; H04N 23/698; H04N 5/2353; H04N 5/247; H04N 23/73; H04N 23/90; G03B 17/40; G03B 37/00; G01S 19/47

USPC ............................................................ 348/38
See application file for complete search history.

(56) References Cited

U.S. PATENT DOCUMENTS

| | | | |
|---|---|---|---|
| 10,084,966 B2 | 9/2018 | Burgess | |
| 2004/0183908 A1* | 9/2004 | Tominaga | H04N 7/188 348/E5.037 |
| 2007/0152804 A1* | 7/2007 | Breed | G08G 1/096783 701/301 |
| 2012/0274772 A1* | 11/2012 | Fosburgh | G01C 11/04 348/149 |

(Continued)

FOREIGN PATENT DOCUMENTS

| | | | | |
|---|---|---|---|---|
| EP | 1903534 A1 * | 3/2008 | ............ | G03B 37/04 |
| KR | 101567485 B1 | 11/2015 | | |

*Primary Examiner* — Thai Q Tran
*Assistant Examiner* — Nienru Yang
(74) *Attorney, Agent, or Firm* — The Webb Law Firm (57) ABSTRACT

Provided is a triggering system for triggering a plurality of vehicle-mounted cameras for obtaining a set of images. The present invention further relates to a camera system including the same. The triggering system includes a central unit and a plurality of camera controllers that each control one or more cameras. The present invention proposes a combination of a de-centralized updating process to determine the respective triggering time instants for the cameras, and a local timer in each of the camera controllers that is repeatedly synchronized using GNSS time information. This allows better control of the position of the entrance pupils of the cameras at the time of recording images. This will in turn produce a set of images that enables the generation of a panoramic image having less parallax-related errors.

15 Claims, 4 Drawing Sheets

(56) References Cited

U.S. PATENT DOCUMENTS

| | | | |
|---|---|---|---|
| 2016/0021292 A1* | 1/2016 | Zhang | H04N 5/06 348/211.2 |
| 2017/0171433 A1* | 6/2017 | Ross | H04N 23/45 |
| 2018/0188032 A1* | 7/2018 | Ramanandan | G01S 19/52 |

* cited by examiner

TRIGGERING SYSTEM

CROSS-REFERENCE TO RELATED APPLICATION

This application claims priority to The Netherlands Patent Application No. 2028779 filed Jul. 19, 2021, the disclosure of which is hereby incorporated by reference in its entirety.

BACKGROUND OF THE INVENTION

Field of the Invention

The present invention relates to a triggering system for triggering a plurality of vehicle-mounted cameras for obtaining a set of images. The present invention further relates to a camera system comprising the same.

Description of Related Art

Today, several methods are available for generating panoramic images. An example of such a method and corresponding system is described in EP1903534A1. In the known method, a vehicle travels along a given trajectory. At particular positions along the trajectory, it is desired to obtain panoramic images. These panoramic images are generated using images obtained using vehicle-mounted cameras. These cameras have different field-of-views such that the combination of the images enables the generation of a 360 degrees panoramic image.

Hereinafter, the images used for generating a single panoramic image will be jointly referred to as a set of images. Typically, each of the abovementioned positions along the trajectory is associated with a different respective set of images. Furthermore, the distance between these positions along the trajectory will be referred to as the recording distance.

To avoid parallax in the final panoramic image, the known method proposes to trigger the vehicle-mounted cameras separately such that at a time of recording an image, the entrance pupils of the cameras are at substantially the same position in space. Put differently, although the vehicle is moving, by appropriately timing the cameras, it can be ensured that the resulting images in the set of images are substantially the same as if these images were recorded using the cameras positioned at a same position in space.

As the specifications of cameras have improved over time, parallax errors and other artefacts become more visible despite using the triggering method described above. The Applicant has found that this is related to inaccurate timing of the cameras. Put differently, the Applicant has found that existing triggering systems are not able to sufficiently ensure that the vehicle-mounted cameras are triggered at the appropriate times. Consequently, the entrance pupils of the cameras are, at the time of recording an image, not positioned at the same position in space.

SUMMARY OF THE INVENTION

It is therefore an object of the present invention to provide an improved triggering system in which the abovementioned problems do not occur or at least to a lesser extent.

According to the present invention, this object is achieved using the triggering system as described herein that comprises a central unit and a plurality of camera controllers that each control one or more cameras among a plurality of vehicle-mounted cameras.

The central unit comprises a primary controller that is configured to repeatedly receive time information from a Global Navigation Satellite System, GNSS, and to repeatedly receive acceleration data from an inertial measurement unit, IMU. The primary controller is further configured to repeatedly generate first time data based on the received time information, to repeatedly generate motion data based on and/or comprising the received acceleration data, to generate second time data related to an instant in time at which recording of the set of images should start, to repeatedly transmit the first time data and motion data to the plurality of camera controllers, and to transmit the second time data to the plurality of camera controllers.

Each camera controller comprises a local timing unit configured for generating third time data, and a secondary controller configured to trigger the one or more cameras among the plurality of vehicle-mounted cameras to initiate a recording of an image by the one or more cameras. The secondary controller of each camera controller is further configured to repeatedly synchronize the local timing unit of that camera controller based on the received first time data, to repeatedly determine, for each camera among the one or more cameras, a respective triggering time instant at which a recording of an image should be initiated based on relative mounting position data of that camera, and the received motion data. Furthermore, each secondary controller is configured to repeatedly compare the third time data to a most recently determined triggering time instant for each of the one or more cameras. Based on this comparison result, the secondary controller will trigger each of the one or more cameras such that entrance pupils of the plurality of cameras are substantially at a same position at a time of recording the respective images.

The communication between the central unit and the plurality of camera controllers may use a communication bus. More in particular, communication over this bus may be based on the precision time protocol, PTP. According to this protocol, a delay in communication from the central unit to the plurality of camera controllers can be established.

Compared to a system in which the central unit would directly control the plurality of cameras, the system of the present invention is much less dependent on the availability of the GNSS signal. Put differently, in the present invention, the GNSS signal is required only periodically for synchronizing the local timing units of the camera controllers.

Because the vehicle generally moves with a non-constant speed and/or direction, it is required to regularly update or correct the triggering time instants. According to the present invention, this update or correction process is performed by the secondary controller instead of by the central unit. Because the communication between the secondary controller and the one or more cameras it controls does not depend on the latency associated with the abovementioned communication bus, triggering of the cameras can be more accurate.

The combination of the de-centralized updating process to determine the respective triggering time instants and the repeated synchronization of the local timing unit using GNSS time information allows for better control of the position of the entrance pupils of the cameras at the time of recording images. In turn, this will produce a set of images that enables the generation of a panoramic image having less parallax-related errors.

When recording a set of images, typically one camera among the plurality of cameras is triggered first. This camera will hereinafter be referred to as the first camera. It is noted that the accuracy of the position in space of the entrance pupil of that camera at the time of recording an image is not that important as ensuring that the entrance pupils of the cameras that are triggered next are at that same position. In that respect, it is the relative positioning of the cameras on the vehicle that is important. This relative positioning of the cameras is reflected in the relative mounting position data.

Each camera controller may comprise a memory in which a respective previously determined triggering time instant is stored for each of the one or more cameras. The repeatedly determining of the respective triggering time instant may comprise correcting the previously determined triggering time instant based on the received motion data. For example, the memory may further comprise, for each of the one or more cameras, a respective position register for holding a value of a distance still to be travelled or traversed by the vehicle before the entrance pupil of the relevant camera is at the desired position. The secondary controller may then be configured, for each of the one or more cameras, to determine this distance based on a respective previously stored value of the distance and currently received motion data, to determine the triggering time instant based on the determined distance, the currently received motion data, and the third time data, and to update the stored distance using the determined distance.

Consequently, according to the present invention, the distance still to be travelled by the vehicle before the entrance pupil of a given camera is at the desired position is repeatedly corrected based on the received motion data. These data allow the secondary controller to determine how fast the vehicle was moving and therefore the amount of distance that was travelled by the vehicle. By subtracting this amount from the previously stored value of the distance still to be travelled, a new value can be computed. Then, based on the current motion data, the secondary controller can estimate how much time is required to cover this distance. By adding this amount of time to the third time data, an updated triggering time instant can be computed.

It should be noted that the computation of the amount of time required for covering the newly computed distance may not only be based on the current motion data but also on previous motion data. For example, some fitting process may be used to estimate the future velocity and/or acceleration of the vehicle.

The secondary controller may further be configured, for each of the one or more cameras, to determine a first value of the distance based on the relative mounting position data of that camera and the received motion data, and to compute subsequent values of the distance based on a previously stored value of the distance, and currently received motion data. For example, the position register for each camera can be initialized for each set of images using the relative mounting position data of that camera. Alternatively, the secondary controller may be configured to determine, for each of the one or more cameras, the distance based on the relative mounting position data and currently and previously received motion data. In this case, a previously determined distance is not used for computing a new distance. Rather, current and past motion data are used to calculate the distance travelled by the vehicle.

Each of the plurality of cameras can be arranged at a respective fixed distance from a common reference that is stationary relative to the vehicle, wherein the relative mounting position data for each camera correspond to a distance between the entrance pupil of that camera and the common reference. Furthermore, the distance to which the relative mounting position data correspond can be taken along a direction that corresponds to a straight motion of the vehicle. Additionally or alternatively, the relative mounting position data for each camera of the one or more cameras other than one predetermined camera may correspond to a distance of that camera relative to the one predetermined camera. In this case, the entrance pupil of the one predetermined camera is positioned at the abovementioned common reference, and the relative mounting position data of the other cameras indicate a distance between their entrance pupils to the entrance pupil of the one predetermined camera.

The secondary controller of each camera controller may be configured to determine, for each of the one or more cameras, the respective triggering time instant such that at a predefined point in time within an exposure time window of said camera the entrance pupil is at a same position in space as the common reference at the time instant corresponding to the second time data. Information regarding the exposure time to be used for each of the plurality of cameras may be transmitted by the central unit to the camera controllers.

The secondary controller of each camera controller can be configured to determine, for each of the one or more cameras, the respective triggering time instant also based also on the exposure time to be used by that camera. Furthermore, the secondary controller of each camera controller may be further configured to determine, for each of the one or more cameras, the respective triggering time instant also based on shutter latency values indicating a time required for opening and/or closing a shutter for that camera such that at said predefined point in time within the exposure time window, substantially half of the light that would be captured by the camera under constant light intensity conditions has been captured. It is noted that for each camera controller, the shutter latency values and/or the relative mounting position data for each of the one or more cameras can be stored in the memory of the camera controller.

The primary controller can be configured to determine a position in space of the vehicle based on data received from the GNSS and the IMU. Additionally, the primary controller can be further configured to receive travelled distance information from a distance measuring instrument, DMI, and to determine the position in space of the vehicle based on data received from the GNSS and the IMU and/or DMI. To determine the position in space of the vehicle based on GNSS, IMU, and/or DMI data is known in the art. This position data can be used by the primary controller when it comprises and/or is connected to a database comprising position dependent exposure time, to determine the exposure time to be transmitted to the plurality of camera controllers based on the determined position in space of the vehicle. For example, when the vehicle is positioned in an urban area having tall buildings, a longer exposure time can be selected. Similarly, the exposure time may be selected based on other criteria as well, such as weather conditions.

The central unit may comprise a local timing unit. This local timing unit comprises a local timer and a time register. The primary controller can be configured to generate the first time data based on a time value associated with the local timer of the central unit and the time information received from the GNSS, and to store the generated first time data in the time register. Furthermore, the primary controller can be configured to repeatedly synchronize the local timing unit of the central unit using the received time information. In addition, the primary controller can be configured to repeatedly determine an offset between a time value associated with the local timer and the time information from the GNSS during a time when the time information from the GNSS is available, and to determine the first time data using the time value associated with the local timer and a most recent determined value of the offset between a time value associated with the local timer and the time information from the GNSS. Furthermore, the primary controller can be configured to determine the first time data using the time value associated with the local timer of the central unit and a currently and previously determined value of the offset between a time value associated with the local timer and the time information from the GNSS. The primary controller is preferably configured to determine the first time data using the time value associated with the local timer and a dynamic offset that gradually changes over time from the previously determined offset to the currently determined offset.

Similarly, the local timing unit of each camera controller may comprise a further local timer and a further time register, wherein the secondary controller of each camera controller is configured to generate the third time data based on a time value associated with the further local timer and the first time data received from the central unit, and to store the generated third time data in the further time register. The secondary controller of each camera controller may be configured to repeatedly synchronize the local timing unit of that camera controller using the received first time data. The secondary controller of each camera controller can be configured to repeatedly determine an offset between a time value associated with the further local timer and the received first time data, and to determine the third time data using the time value associated with the further local timer and a most recent determined value of the offset between a time value associated with the further local timer and the received first time data. In this case, the secondary controller of each camera controller can be configured to determine the third time data using the time value associated with the further local timer and a currently and previously determined value of the offset between a time value associated with the further local timer and the received first time data. The secondary controller is preferably configured to determine the third time data using the time value associated with the further local timer and a dynamic offset that gradually changes over time from the previously determined offset to the currently determined offset.

The first time data, the second time data, and/or the third time data may each comprise a counter value, wherein each increment of the counter value represents the elapsing of a predetermined amount of time, and wherein a zero value of the counter value represents a predefined time instant in the past. For example, the first time data, the second time data, the third time data, and the triggering time instants may each be expressed as an n-bit value, for example n=64, wherein the least significant bit indicates the elapsing of 1 nanosecond, and wherein the zero value of the n-bit value indicates the year 0000, 0 days, 0 hours, 0 minutes, 0 nanoseconds. To this end, the local timer of the central unit and/or the further local timers of the camera controllers may each comprise a counter for which each increment in a value of the counter represents the elapsing of the predetermined amount of time.

The primary controller can be configured to determine a velocity of the vehicle by time-integrating the acceleration data received from the IMU, and to include the determined velocity in the motion data to be transmitted to the plurality of camera controllers.

The fields-of-view of the plurality of cameras at a time of recording the images of the set of images may have a partial overlap for allowing convenient stitching of the images into a panoramic image. Furthermore, the set of images can be configured for generating a panoramic image, preferably a 360 degrees panoramic image.

According to a further aspect, the present invention relates to a camera system configured to be mounted on a vehicle, the camera system comprising a plurality of cameras and the triggering system as defined above for controlling the plurality of cameras.

BRIEF DESCRIPTION OF THE DRAWINGS

Next, the present invention will be described using the appended drawings, wherein.

DESCRIPTION OF THE INVENTION

Figure 1:
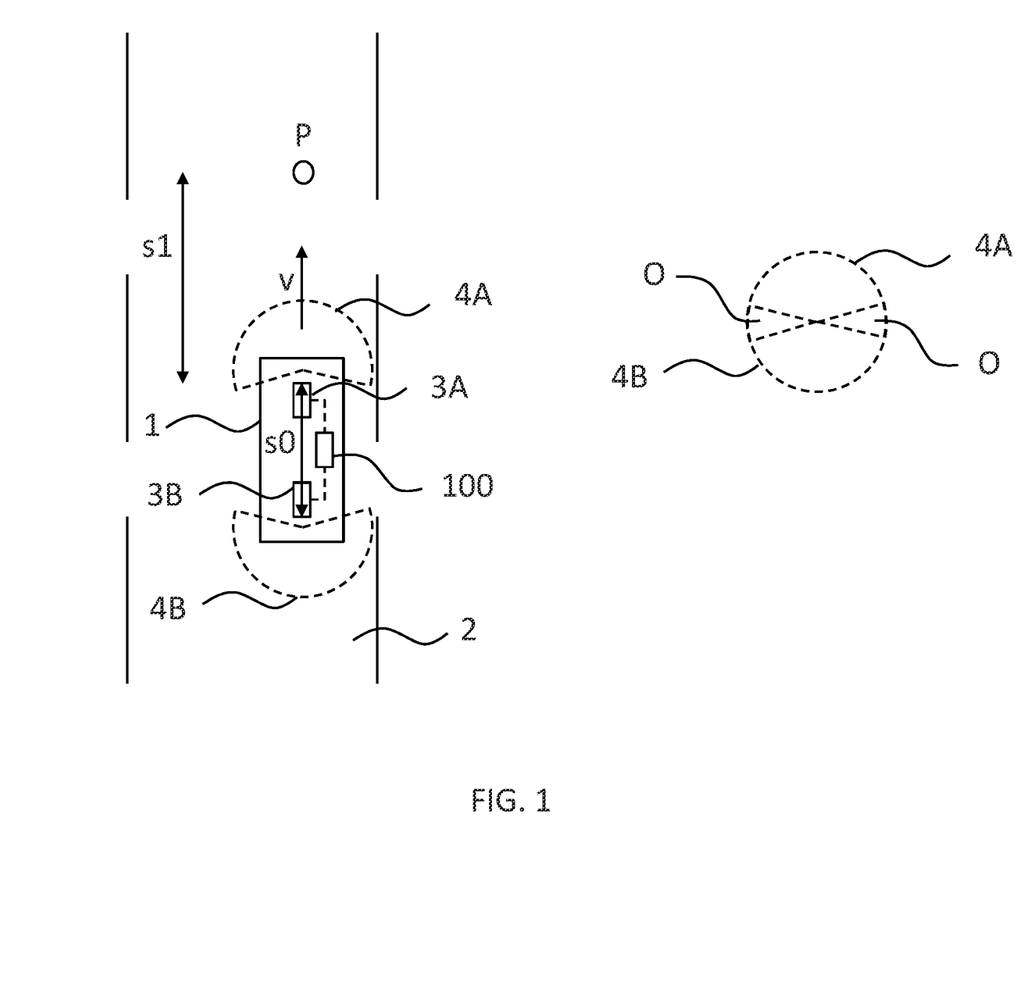
FIG. 1 illustrates a moving vehicle having two wide field-of-view cameras mounted thereon.
Figure 2:
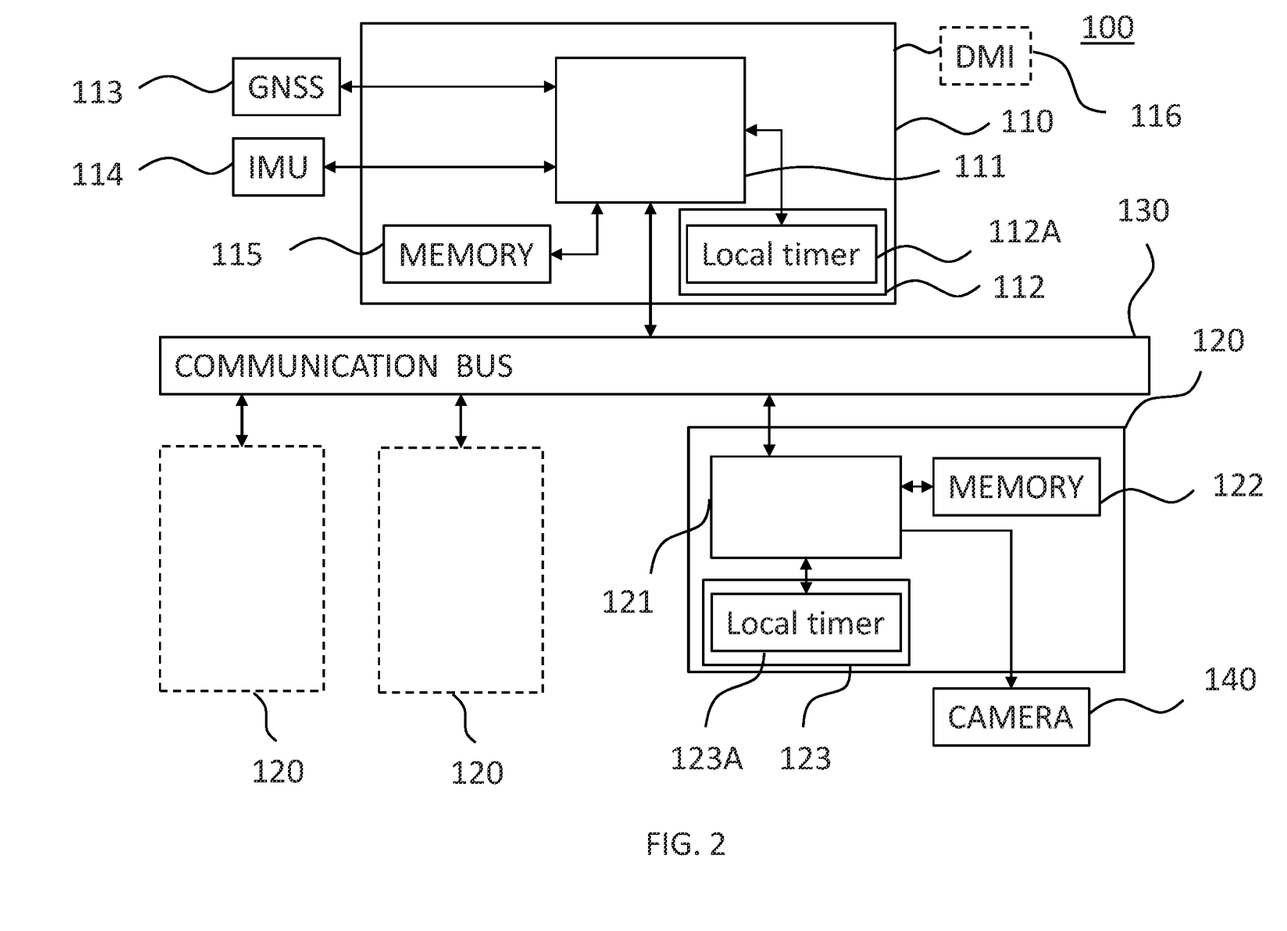
FIG. 2 illustrates an embodiment of the triggering system in accordance with the present invention.

In FIG. 1, a situation is depicted in which a moving vehicle 1, such as a car, moves on a road 2. Vehicle 1 is equipped with a triggering system 100 as illustrated in FIG. 2. Furthermore, vehicle 1 is provided, for example on a roof of vehicle 1, with two or more cameras 3A, 3B that are controlled by triggering system 100. Typically, cameras 3A, 3B are wide field-of-view cameras.

In FIG. 1, the field-of-view of cameras 3A, 3B, is indicated by semi-circles 4A, 4B, respectively. The images obtained by cameras 3A, 3B can be combined to generate a 360 degrees panoramic image as indicated on the right in FIG. 1. To this end, it is important that cameras 3A, 3B are triggered by triggering system 100 such that at the time of recording an image the entrance pupil of each camera is at the same position in space.

For example, to generate a panoramic image corresponding to position P in FIG. 1, it is required to trigger camera 3A at time instant t1 at which its entrance pupil is at position P, and to trigger camera 3B at time instant t2 at which its entrance pupil is at position P. Assuming that vehicle 1 is moving at constant velocity v, that cameras 3A and 3B are separated by a distance s0, and that the distance between position P and the entrance pupil of camera 3A equals s1 at time instant t0, time instants t1 and t2 can be computed according to $t1=t0+s1/v$ and $t2=t0+(s1+s0)/v$.

As can be seen, an overlap O exists between the field-of-views of cameras 3A, 3B provided that at the time of recording the images, the entrance pupils of these cameras were at substantially the same position. This overlap can be used to properly align the images and to prevent or limit stitching artefacts when stitching the images obtained by cameras 3A, 3B into a single panoramic image.

Typically, the generation of panoramic images is performed in a server remote from vehicle 1, but may also be performed by a system in vehicle 1 or a combination thereof. More in particular, during the movement of vehicle 1, the images obtained by cameras 3A, 3B are stored locally. After having completed a particular trajectory, the images are obtained from memory, optionally stored in a server memory remote from vehicle 1, and are combined into respective panoramic images by a server or other type of image processing unit remote from vehicle 1 or arranged in vehicle 1.

To provide parallax-free panoramic images, the triggering of cameras 3A, 3B should be very accurate. For example, for obtaining parallax free panoramic images with state-of-the-art cameras 3A, 3B, the separation in space between the positions of the entrance pupils of cameras 3A, 3B at the time of recording corresponding images should not exceed 1 cm.

To obtain the abovementioned accuracy it is known to use a Distance Measuring Instrument, DMI, which is mounted in or to the vehicle. These instruments measure distance travelled by the vehicle by monitoring the wheel rotation for one or more wheels of the vehicle. For example, a pulse counter may be used that counts the number of pulses, wherein each pulse represents a particular angular rotation of a wheel. To this end, known optical or electrical techniques may be used.

Although DMI-based solutions provide a high degree of accuracy, they do require a DMI to be installed in or on the vehicle. For example, a DMI can be installed on one or more wheels. However, these instruments are likely to get damaged during operation. DMIs can also be installed on the wheel axis but this requires considerable modification of the vehicle.

FIG. 2 illustrates an embodiment of a triggering system 100 in accordance with the present invention that does not require a DMI to determine suitable triggering moments.

System 100 comprises a central unit 110, and a plurality of camera controllers 120, wherein central unit 110 and camera controllers 120 are connected using a communication bus 130. Cameras 140 are controlled by the camera controllers 120 of triggering system 100.

Central unit 110 comprises a primary controller 111, a local timing unit 112 having a local timer 112A and a time register, and a memory 115. Primary controller 111 is connected to a Global Navigation Satellite System, GNSS, 113, and to an inertial measurement unit, IMU, 114.

Primary controller 111 receives time information comprised in the data received from GNSS 113. Furthermore, primary controller 111 receives acceleration data from IMU 114. Based on the data from GNSS 113 and IMU 114, primary controller 111 determines a current acceleration and a current velocity of moving vehicle 1. Typically, primary controller 111 is further configured to compute a position of moving vehicle 1 based on the data from GNSS 113 and IMU 114. This computed position relates to an absolute position in space of vehicle 1. The accuracy of this position, relative to a fixed origin, is in the order of 10-50 cm, and is therefore not suitable for triggering cameras 140 on moving vehicle 1. In addition, for determining a position, a DMI (116) may be additionally or alternatively used.

To determine the acceleration and velocity of moving vehicle 1, primary controller 111 may relay the acceleration data from IMU 114 and may integrate the acceleration over time to compute the velocity. Alternatively, IMU 114 may output values of the acceleration and velocity by itself.

Primary controller 111 stores a time value in the time register of local timing unit (112) as first time data. This time register may be formed by memory 115. The first time data is typically in the form of a 64-bit number. The time value stored in the local time register is indicative of an amount of time lapsed relative to a given reference, e.g. the year 0000, 0 days, 0 hours, 0 minutes, etc.

Primary controller 111 determines the time value to be stored in the time register based on an output of local timer 112A and the time information from GNSS 113. To this end, primary controller 111 converts the time information from GNSS 113 into a corresponding 64-bit number. The output of local timer 112A is typically also a 64-bit number.

The output of local timer 112A will drift over time. On the other hand, the GNSS signal from GNSS 113 may sometimes be unavailable. When using the GNSS time information, primary controller 111 will periodically synchronize local timing unit 112 with the time information from GNSS 113. In this manner, only the drift of local timer 112A during the unavailability of the GNSS signal is relevant.

When the GNSS signal becomes available again, a difference will exist between the GNSS time information and the time value associated with or outputted by local timer 112A. In an embodiment, synchronization of local timing unit 112 comprises resetting local timer 112A to a time value corresponding to the GNSS time information. The time value of the time register corresponds to the output of local timer 112A in this case.

In other embodiments, the difference will not be corrected instantaneously. Rather, primary controller 111 will compute a new time value based on the abovementioned difference and the time value of local timer 112A and store the result in the time register. More in particular, primary controller 111 will repeatedly determine an offset between a time value associated with local timer 112A and the time information from GNSS 113 during a time when the time information from the GNSS 113 is available. Primary controller 111 is configured to determine the first time data using the time value associated with the local timer 112A and a dynamic offset that gradually changes over time from the previously determined offset to the currently determined offset. In this manner, sudden jumps in the time value stored in the time register due to synchronization may be prevented.

Communication between central unit 110 and camera controllers 120 will suffer from time delays. If central unit 110 would issue triggering commands for triggering cameras 140 via communication bus 130, such delays would lead to considerable differences between the positions of the entrance pupils of cameras 140 at the time of recording an image, thereby resulting in considerable parallax.

A first step to address this timing issue involves using a protocol to determine a delay in communication between central unit 110 and each of the camera controllers 120. An exemplary protocol that can be used for this purpose is the Precision Time Protocol, PTP. As a result of executing this protocol, a respective delay is determined between central unit 110 and each camera controller 120. After having determined the delays for each camera controller 120, central unit 110 will communicate these delays to the various camera controllers 120, which will store these values locally.

Typically, triggering system 100 is configured such that cameras 140 will record a set of images each time moving vehicle 1 has traversed a given distance, referred to as the recording distance. The recording distance is typically in the order of a few meters and is stored and/or programmed into memory 115 of central unit 110.

As noted above, it is important when obtaining a set of images that the position of the entrance pupils of cameras 140 at the time of recording the images is substantially identical. Among cameras 140, a camera 140 that is triggered first when recording a set of images will hereinafter be referred to as the first camera. It should be noted that for the purpose of preventing parallax, the relative position of the entrance pupils is far more important than the absolute position of the entrance pupil of the first camera.

Memory 115 may have a first position register that stores the distance moving vehicle 1 still has to travel before a recording of a set of images should start. This distance can be computed using the abovementioned velocity data and acceleration data. In a particular embodiment, the acceleration data used by primary controller 111 to compute the distance that needs to be travelled by moving vehicle 1 is taken from IMU 114 and the velocity used by primary controller 111 is computed by integrating the acceleration over time, wherein the generated first time data stored in the time register may be used.

In a particular embodiment, acceleration data and/or velocity data corresponding to multiple time instants will be used to determine a value for the velocity and/or distance travelled for a particular instant. For example, known interpolation techniques may be used.

Based on the acceleration, velocity, and the value in the first position register, controller 111 will estimate a time value at which the recording of a set of images should start. This time value is stored as second time data in a second time register in memory 115.

Alternatively, primary controller 111 may compute the time value to be stored in the second time register based on a time value corresponding to a time instant at which the recording of a previous set of images was started, the recording distance, and current and previous velocity and acceleration data. In this manner, a first position register is not required as the distance travelled is not stored. However, in this case, the acceleration and/or velocity data should be stored to allow a distance travelled to be computed.

Primary controller 111 will communicate the second time data and the first time data to camera controllers 120 via communication bus 130. Typically, the local timer 112A in central unit 110 changes output more frequently, e.g. every 10 nanosecond, than that first time data is sent to camera controllers 120, e.g. typically at rate of 10 kHz. Similarly, the second time data is sent to camera controllers 120 at a rate of 10 kHz. At the same time, primary controller 111 will communicate exposure settings to be used by cameras 140 for a next exposure. These exposure settings may include an exposure time and may depend on a current position of moving vehicle 1, a current time, and/or current weather conditions. For example, for some positions of moving vehicle 1, e.g. in densely populated areas, the amount of light available may be less so it may advantageous to use a relatively long exposure time. Similar conditions hold when taken into account the time of day or weather conditions.

Each camera controller 120 comprises a secondary controller 121, a memory 122, and a local timing unit 123 that comprises a further local timer 123A and further time register. Furthermore, each camera controller 120 will receive the first time data from central unit 110 and will add the delay for communication with central unit 110 as determined earlier for generating synchronization time data and use these data for synchronizing local timing unit 123. Here, it is noted that the synchronization time data may have a similar format as the first time data.

Similar to synchronizing local timing unit 112, memory 122 may comprise the further time register of which a time value is determined by secondary controller 121 in dependence of the synchronization time data and a time value of further local timer 123A. This time value corresponds to the third time data.

Further local timer 123A can be reset based on the synchronization time data. In this manner, any drift of local timer 112 and/or of further local timer 123A is instantaneously corrected for. In other embodiments, the difference between the synchronization time data and the time value associated with further local timer 123A is not corrected instantaneously. Rather, secondary controller 121 will repeatedly determine an offset between a time value associated with further local timer 123A and the synchronization time data. Secondary controller 121 is configured to determine the third time data using the time value associated with the further local timer 123A and a dynamic offset that gradually changes over time from the previously determined offset to the currently determined offset. In this manner, sudden jumps in the time value stored in the further time register due to synchronization may be prevented.

Memory 122 of a given camera controller 120 also stores a distance value that represents a distance along the longitudinal direction of moving vehicle 1 between the entrance pupil of the camera 140 controlled by that camera controller 120 and a common reference.

Secondary controller 121 of camera controller 120 will determine a triggering time instant corresponding to a time instant at which the camera 140 that it controls needs to be triggered. To this end, secondary controller 121 uses the second time data as received from central unit 110, which indicates the moment in time at which the recording of a set of images should start, the acceleration and velocity data received from central unit 110, the distance value for that camera 140, the exposure settings received from central unit 110, and camera specific settings corresponding to camera 140 such as shutter latency values. These later settings may be stored in memory 122.

Figure 3:
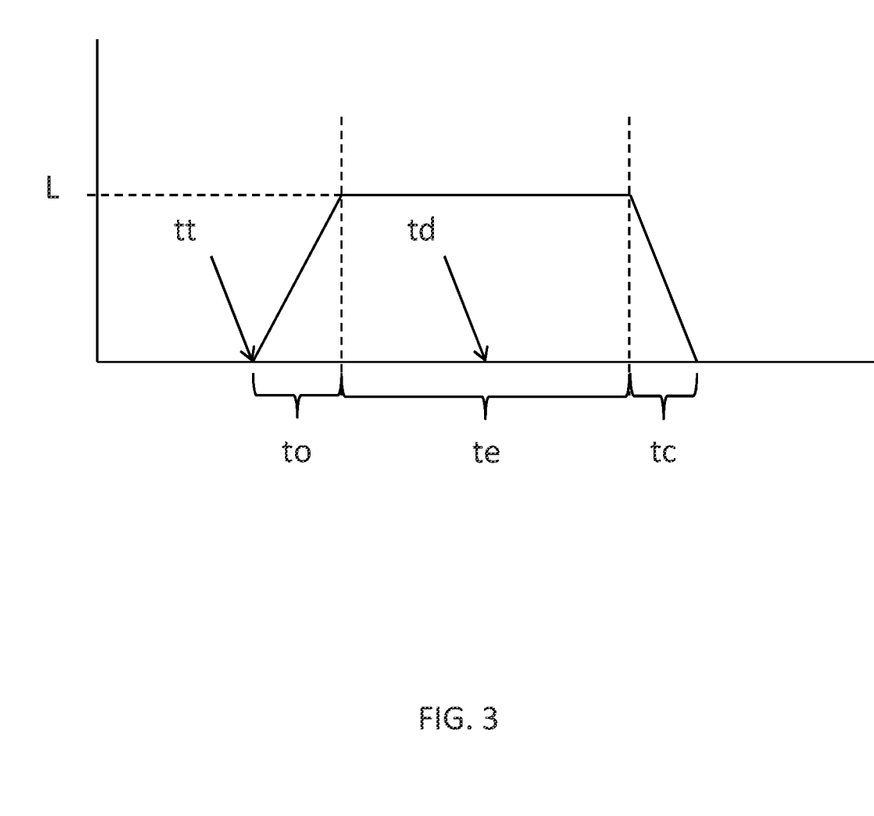
FIG. 3 illustrates a graph for determining the triggering time of a camera for the triggering system of FIG. 2.

Each camera 140 cannot respond instantaneously to a triggering signal. For example, the shutters require some amount of time for opening and closing. This is illustrated in FIG. 3, wherein the x-axis corresponds to time and the y-axis to the amount of light received per unit time. The time interval during which light can be captured by a camera 140 therefore depends on the shutter latency values and the exposure time itself. In an embodiment, the position of the entrance pupil in absolute space should be at a desired position somewhere halfway the exposure process. Assuming that the light intensity increases or decreases linearly when opening and closing shutters, respectively, and that the light intensity remains constant during the exposure time, the total amount of light TL captured by a camera 140 can be computed using:

$$TL = to \times \frac{L}{2} + te \times L + tc \times \frac{L}{2}$$

where to is the shutter latency for opening the shutters, tc the shutter latency for closing the shutters, te the exposure time, and L the amount of light per unit time. In an embodiment, the time instant td at which the entrance pupil is at the correct position in absolute space, i.e. relative to the position of the entrance pupil of the first camera, should correspond to a time instant at which half the total amount of light has been captured by camera 140. The triggering time tt can then be computed relative to desired time instant td using, see also FIG. 3:

$$to \times \frac{L}{2} + (td - tt - to) \times L = \frac{TL}{2} = \left(to \times \frac{L}{2} + te \times L + tc \times \frac{L}{2}\right)/2$$

$$tt = td - \left(to \times \frac{3}{4} + tc \times \frac{1}{4} + te \times \frac{1}{2}\right)$$

Each time secondary controller 121 receives new data from central unit 110 it will re-compute the triggering time tt relevant.

In an embodiment, secondary controller 121 computes, using the acceleration and velocity data, and the second time data received from central unit 110, what the distance travelled by moving vehicle 1 is, what the remaining distance is, and what time is required to cover that distance.

Based on this last computation, a time value for the abovementioned desired time td can be calculated. Finally, the triggering tt is calculated using the equation above and is stored in a second time register in memory 122.

Memory 122 may have a position register holding a value of the distance to be travelled by moving vehicle 1 before triggering camera 140. Each time new data is received, controller 121 may compute a new value for this distance based on the previous value for this distance, the time lapsed between determining the new and old value, and the most recent acceleration and velocity data. Based on this new distance, a new time value for the second time register can be computed.

It is noted that the abovementioned computation by secondary controller 121 for updating and/or correcting the time value stored in second time register may not be performed when a difference between a time value corresponding to the third time data and a time value corresponding to the second time data is below a threshold value.

Secondary controller 121 will compare the third time data with the time value in the second time register in memory 122. If the third time data exceed the time value in the second time register, controller 121 will issue a triggering command to camera 140 and will clear the second time register. The process described above will repeat when the first camera has been triggered again.

It is noted that each remote unit 120 can be configured substantially identically. By setting the distance value to zero for a given camera, that camera can be designated as the first camera. The first camera will be triggered such that the desired time td for that camera corresponds to the time value stored in second time register of memory 115.

The images recorded by cameras 140 are stored in memories 122 of the associated remote units 120. At the same time, the time value of the second time register in memory 122 for each image may be stored in memory 122 either separately or as metadata for each image. Consequently, each set of corresponding images can be identified by inspecting the stored time data.

The present invention can be easily extended to multiple camera controllers 120. Furthermore, each camera controller 120 may be configured to control multiple cameras 140. In this latter case, memory 122 of that camera controller 120 may have multiple time registers each corresponding to a different camera.

By performing the correction to the desired times td within camera controllers 120 and by using local timing units that are repeatedly synchronized by central unit 110, the system is less vulnerable to packet loss occurring inside communication bus 130 or to the incidental loss of the GNSS signal. Moreover, due to a repeated synchronization with the GNSS time information, drift of the further local timers of the remote units can be minimized.

Figure 4:
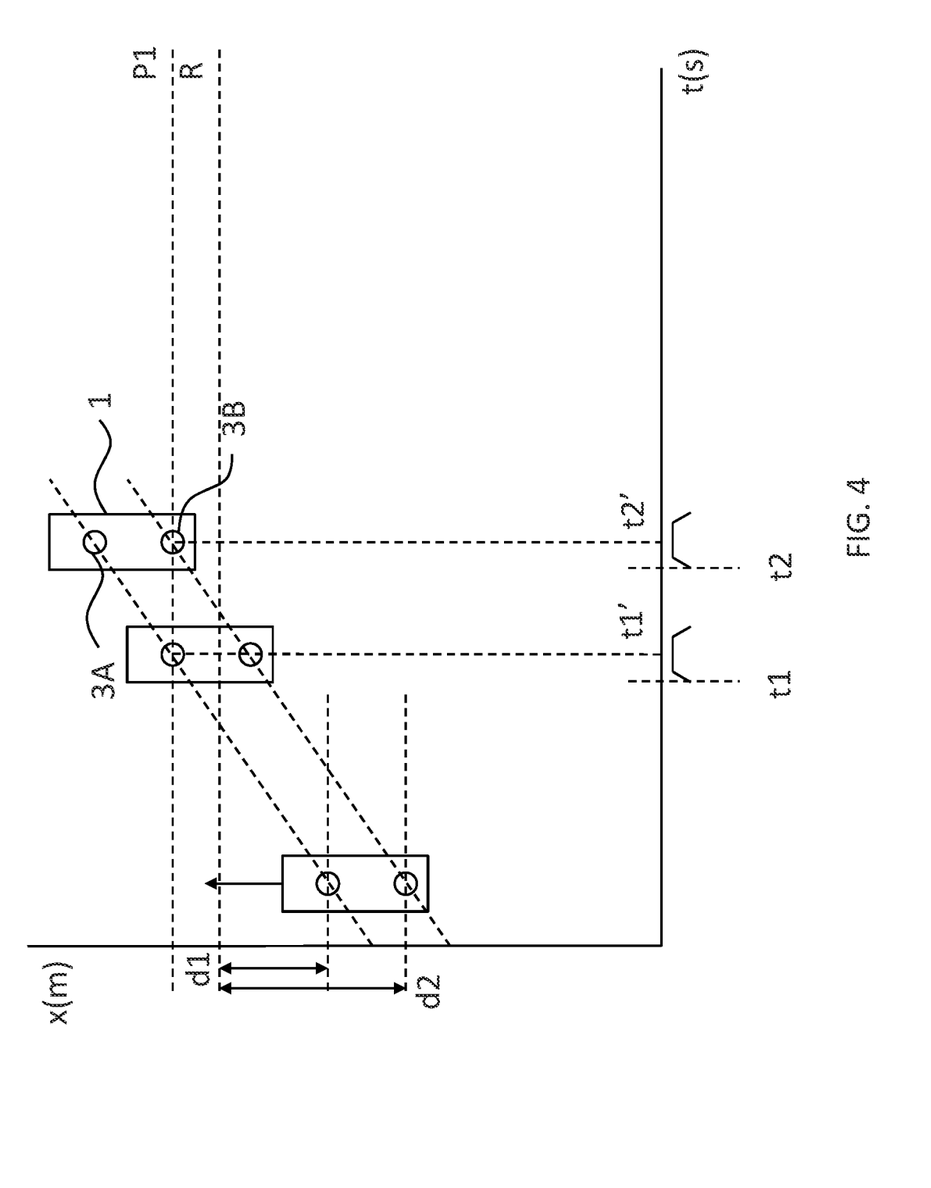
FIG. 4 illustrates the triggering of the cameras on the vehicle of FIG. 1 when the vehicle moves in a single direction.

FIG. 4 illustrates the triggering of cameras 3A, 3B on vehicle 1 when vehicle 1 moves in the x-direction. This direction corresponds to the direction of motion of vehicle 1 when vehicle moves in a straight manner, e.g. with a neutral position of the steering wheel. Here, it is assumed that cameras 3A, 3B are separated by a distance d1 and d2 from a common reference R, respectively. Furthermore, it is assumed that a recording distance of 10 m has been set in memory 115. In addition, in the situation shown in the FIG. 4, primary controller 111 has determined that 7 meter still has to be travelled before reaching position P1 at which position a new set of images needs to be recorded. The distance to be travelled before recording a new set of images is stored in the first position register of memory 115. Based on the motion data from IMU 114 and this distance to be travelled, primary controller 111 computes second time data and transmits these data to camera controllers 120 for cameras 3A, 3B. Alternatively, other positioning means can be used to update the distance to be travelled.

Typically, the value for the distance to be travelled in the first position register in memory 115 is updated regularly, e.g. 200 times per second. However, such correction is stopped if the distance to be travelled is less than a predetermined first threshold and/or if the temporal distance between the time instant associated with the second time data and the first time data is less than a predetermined second threshold.

The relative mounting position data of camera 3A corresponds to d1 and is stored in memory 122 of camera controller 120 that controls camera 3A. Similarly, the relative mounting position data of camera 3B corresponds to d2 and is stored in memory 122 of camera controller 120 that controls camera 3B.

Based on the second time data received from primary controller 111, secondary controller 121 computes a triggering time instant. More in particular, secondary controller 121 takes the received motion data and the distance stored in a position register in memory 122. This latter distance represents the distance still to be travelled by vehicle 1 before initiating recording of an image. Based on the motion data, a time required for covering this distance is computed. For example, it can be assumed that the current motion data represents the motion of vehicle 1 between the previous determination of the triggering time instant and the current determination. More specifically, a new value for the distance to still be traversed, $d_{new}$, can be computed from a previous value $d_{old}$ using:

$$d_{new} = d_{old} - vt - \frac{1}{2}at^2$$

where v represents the velocity and a the acceleration determined using the output of IMU 114. In some embodiments, IMU 114 outputs acceleration data only and the corresponding velocity data is determined by time-integrating the acceleration data. Such integration can be performed by primary controller 111 using the first time data, in which case the velocity and acceleration are both part of the motion data broadcasted by primary controller 111, or by secondary controllers 121 using the third time data, in which only the acceleration is part of the motion data. It should be noted that other methods are known for determining the distance to be travelled based on a previous distance and received motion data.

Secondary controller 121 computes the time required to travel $d_{new}$ and adds this value to the third time data to yield the triggering time instant and stores this value in the second time register of memory 122.

Secondary controller 121 continuously compares the triggering time instant to third time data. If the triggering time instant is reached, secondary controller 121 triggers the corresponding camera.

It should be noted that it may be advantageous to block the updating of the triggering time instant when the distance to be travelled that is stored in memory 122 is below a given threshold or if the temporal distance between the third time data and the triggering time instant is below a different given threshold.

To prevent a situation in which new second time data is broadcast before the last camera has recorded an image, primary controller 111 may prevent broadcasting second time data that is associated with a next set of images if the distance traversed by vehicle 1 after the moment in time associated with the second time data has passed is not yet above a given threshold. Alternatively, primary controller 111 may prevent broadcasting a new value for the second time data during a predetermined amount of time after the moment in time associated with the second time data.

Additionally or alternatively, secondary controller 121 may be configured to disregard the second time data if such data would increase the distance to be travelled to a value that is above the recording distance plus an optional threshold.

As shown in FIG. 4, at time instant t1, camera 3A will start recording an image. More in particular, at time instant t1', which is the desired time for camera 3A, the entrance pupil of that camera will be at position P1 and will have recorded half of the light that would fall onto camera 3A in the exposure window under constant light intensity conditions. Similarly, at time instant t2 camera 3B will start recording an image, and at time instant t2', which is the desired time for camera 3B, the entrance pupil of that camera will also be at position P1.

In the above, the present invention has been explained using detailed embodiments thereof. However, the present invention is not limited to these embodiments. Various modifications are possible to the embodiments without deviating from the scope of the present invention which is defined by the appended claims and their equivalents.

The invention claimed is:

1. A triggering system for triggering a plurality of vehicle-mounted cameras for obtaining a set of images, the system comprising:
    a plurality of camera controllers that each control one or more cameras among the plurality of vehicle-mounted cameras; and
    a central unit comprising a primary controller that is configured to:
        repeatedly receive time information from a Global Navigation Satellite System, GNSS, and to repeatedly receive acceleration data from an inertial measurement unit, IMU;
        repeatedly generate first time data based on the received time information;
        repeatedly generate motion data based on and/or comprising the received acceleration data;
        generate second time data related to an instant in time at which recording of the set of images should start;
        repeatedly transmit said first time data and motion data to the plurality of camera controllers; and
        transmit said second time data to the plurality of camera controllers;
    wherein each camera controller comprises a local timing unit configured for generating third time data, and a secondary controller configured to trigger said one or more cameras among the plurality of vehicle-mounted cameras to initiate a recording of an image by said one or more cameras, the secondary controller of each camera controller being configured to:
        repeatedly synchronize the local timing unit of that camera controller based on the received first time data;
        repeatedly determine, for each camera among the one or more cameras, a respective triggering time instant at which a recording of an image should be initiated based on relative mounting position data of that camera, and the received motion data;
        repeatedly compare the third time data to a most recently determined triggering time instant for each of said one or more cameras; and
        trigger each of said one or more cameras based on a most recent comparison result such that entrance pupils of the plurality cameras are substantially at a same position at a time of recording the respective images.

2. The triggering system according to claim 1, wherein each camera controller comprises a memory in which a respective previously determined triggering time instant is stored for each of the one or more cameras, wherein said repeatedly determining the respective triggering time instant comprises correcting said previously determined triggering time instant based on the received motion data.

3. The triggering system according to claim 2, wherein the memory further comprises, for each of the one or more cameras, a respective position register for holding a value of a distance still to be travelled by the vehicle, wherein the secondary controller is configured to, for each of the one or more cameras:
    determine said distance based on a respective previously stored value of the distance and currently received motion data;
    update the stored distance using the determined distance; and
    determine the triggering time instant based on the stored distance, currently received motion data, and the third time data.

4. The triggering system according to claim 3, wherein the secondary controller is configured to:
    for each of the one or more cameras, determine a first value of the distance based on the relative mounting position data of that camera and the received motion data, and compute subsequent values of the distance based on a previously stored value of the distance, and currently received motion data; or
    determine, for each of the one or more cameras, the distance based on the relative mounting position data and currently and previously received motion data; and/or
    wherein the secondary controller is configured to determine the triggering time instant for each of the one or more cameras using the determined distance, the third time data, and the currently received motion data, when the third time data is equal to or later than the received second time data.

5. The triggering system according to claim 1, wherein each of the plurality of cameras is arranged at a respective fixed distance from a common reference that is stationary relative to the vehicle, wherein the relative mounting position data for each camera correspond to a distance between the entrance pupil of that camera and the common reference;
    wherein the distance to which the relative mounting position data correspond is preferably taken along a direction that corresponds to a straight motion of the vehicle; and/or
    wherein the relative mounting position data for each camera of the one or more cameras other than one predetermined camera preferably correspond to a distance of that camera relative to the predetermined camera.

6. The triggering system according to claim 5, wherein the secondary controller of each camera controller is configured to determine, for each camera controlled by said secondary controller, the respective triggering time instant such that at a predefined point in time within an exposure time window of said camera the entrance pupil is at a same position in space as the common reference at the time instant corresponding to the second time data.

7. The triggering system according to claim 6, wherein the secondary controller of each camera controller is configured to determine, for each of the one or more cameras, the respective triggering time instant also based on the exposure time to be used by that camera;
   wherein the secondary controller of each camera controller is preferably further configured to determine, for each of the one or more cameras, the respective triggering time instant also based on shutter latency values indicating a time required for opening and/or closing a shutter for that camera such that at said predefined point in time within the exposure time window, substantially half of the light that would be captured by the camera under constant light intensity conditions has been captured, wherein for each camera controller, the shutter latency values and/or the relative mounting position data for each of the one or more cameras are preferably stored in the memory of the camera controller.

8. The triggering system according to claim 1, wherein the primary controller is configured to determine a position in space of the vehicle based on data received from the GNSS and the IMU;
   wherein the primary controller is preferably further configured to receive travelled distance information from a distance measuring instrument, DMI, and to determine the position in space of the vehicle based on data received from the GNSS and the IMU and/or DMI; and/or
   wherein the primary controller preferably comprises and/or is connected to a database comprising position dependent exposure time, and wherein the primary controller is configured to determine the exposure time to be transmitted to the plurality of camera controllers based on said determined position in space of the vehicle.

9. The triggering system according to claim 1, wherein the central unit comprises a local timing unit, said local timing unit comprising a local timer and a time register, wherein the primary controller is configured to generate the first time data based on a time value associated with the local timer and the time information received from the GNSS, and to store the generated first time data in the time register;
   wherein the primary controller is preferably configured to repeatedly synchronize the local timing unit of the central unit using the received time information, wherein the primary controller is more preferably configured to:
      repeatedly determine an offset between a time value associated with the local timer and the time information from the GNSS during a time when the time information from the GNSS is available; and
      determine the first time data using the time value associated with the local timer and a most recent determined value of the offset between a time value associated with the local timer and the time information from the GNSS;
   wherein the primary controller is preferably configured to determine the first time data using the time value associated with the local timer of the central unit and a currently and previously determined value of the offset between a time value associated with the local timer and the time information from the GNSS, said primary controller preferably being configured to determine the first time data using the time value associated with the local timer and a dynamic offset that gradually changes over time from the previously determined offset to the currently determined offset.

10. The triggering system according to claim 1, wherein the local timing unit of each camera controller comprises a further local timer and a further time register, wherein the secondary controller of each camera controller is configured to generate third time data based on a time value associated with the further local timer and the first time data received from the central unit, and to store the generated third time data in the further time register;
    wherein the secondary controller of each camera controller is preferably configured to repeatedly synchronize the local timing unit of that camera controller using the received first time data, wherein the secondary controller of each camera controller is more preferably configured to:
       repeatedly determine an offset between a time value associated with the further local timer and the received first time data; and
       determine the third time data using the time value associated with the further local timer and a most recent determined value of the offset between a time value associated with the further local timer and the received first time data.

11. The triggering system according to claim 10, wherein the secondary controller of each camera controller is configured to determine the third time data using the time value associated with the further local timer and a currently and previously determined value of the offset between a time value associated with the further local timer and the received first time data, said secondary controller preferably being configured to determine the third time data using the time value associated with the further local timer and a dynamic offset that gradually changes over time from the previously determined offset to the currently determined offset.

12. The triggering system according to claim 1, wherein the first time data, the second time data, the third time data, and/or the third time data, each comprise a counter value, wherein each increment of the counter value represents the elapsing of a predetermined amount of time, and wherein a zero value of the counter value represents a predefined time instant in the past;
    wherein the local timer of the central unit and/or the further local timers of the camera controllers preferably comprise a counter for which each increment in a value of the counter represents the elapsing of the predetermined amount of time.

13. The triggering system according to claim 1, wherein the primary controller is configured to determine a velocity of the vehicle by time-integrating the acceleration data received from the IMU, and to include the determined velocity in the motion data to be transmitted to the plurality of camera controllers.

14. The triggering system according claim 1, wherein the fields-of-view of the plurality of cameras at a time of recording the images of the set of images have a partial overlap; and
    wherein the set of images is preferably configured for generating a panoramic image, preferably a 360 degrees panoramic image.

15. A camera system configured to be mounted on a vehicle, the camera system comprising:
    a plurality of cameras;

the triggering system according to claim 1 for controlling the plurality of cameras.

\* \* \* \* \*

UNITED STATES PATENT AND TRADEMARK OFFICE
CERTIFICATE OF CORRECTION

PATENT NO. : 12,302,040 B2
APPLICATION NO. : 17/867471
DATED : May 13, 2025
INVENTOR(S) : José Herculano Lopes Barreto et al.

Page 1 of 1

It is certified that error appears in the above-identified patent and that said Letters Patent is hereby corrected as shown below:

In the Claims

Column 16, Line 58, Claim 14, after "according" insert -- to --

Signed and Sealed this
Fifteenth Day of July, 2025

Coke Morgan Stewart
*Acting Director of the United States Patent and Trademark Office*